Jan. 13, 1942.          T. H. SWAN ET AL                    2,269,797
                           FUSED COLLAR
                    Original Filed Nov. 20, 1937
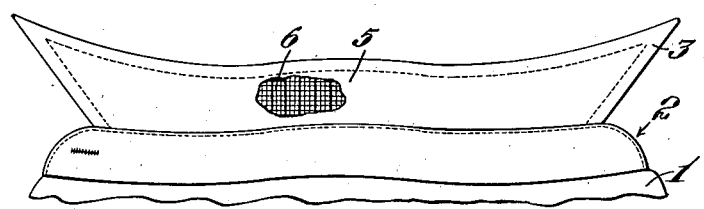
Fig.1
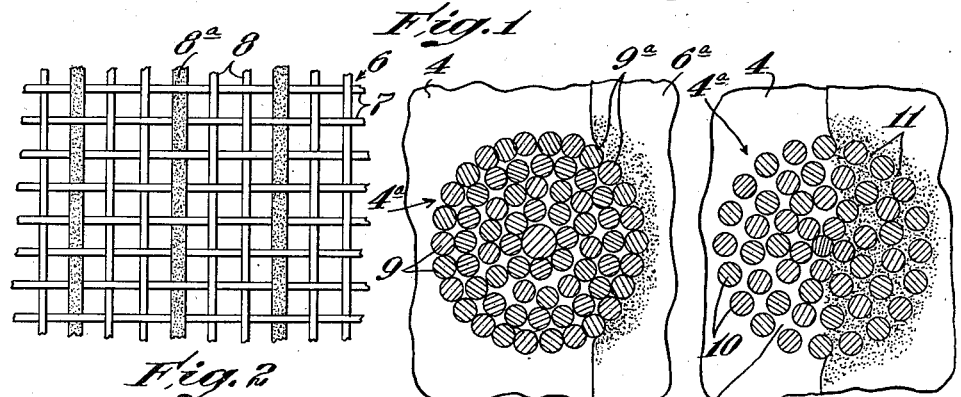
Fig.2    Fig.3    Fig.4
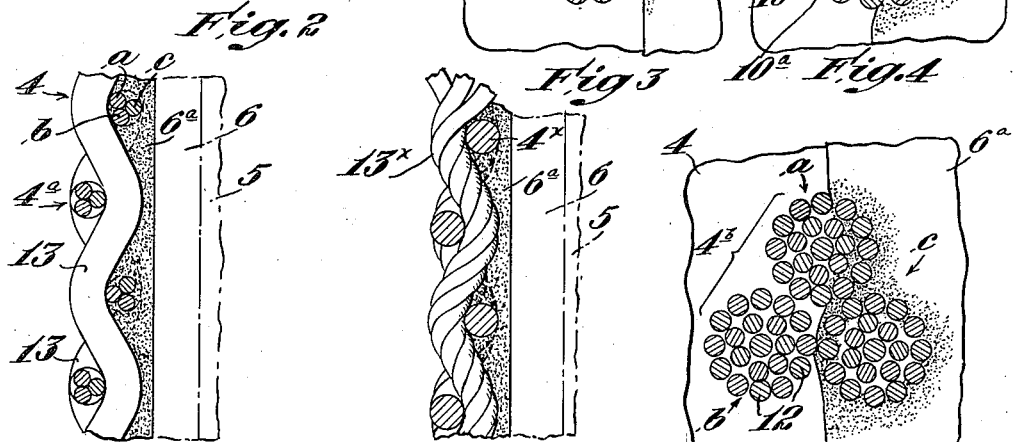
Fig.7    Fig.8    Fig.5
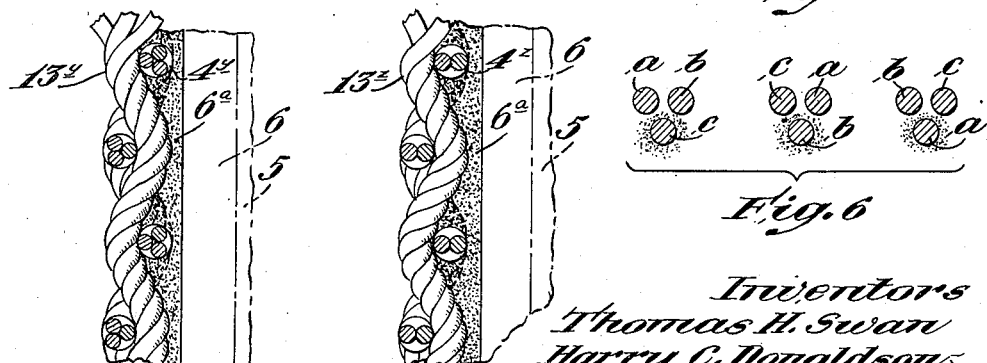
Fig.9    Fig.10
Inventors
Thomas H. Swan
Harry C. Donaldson
by Roberts Cushman & Woodberry
Attys.

Patented Jan. 13, 1942

2,269,797

UNITED STATES PATENT OFFICE 2,269,797

FUSED COLLAR

Thomas H. Swan, Troy, and Harry C. Donaldson, Jr., Brunswick, N. Y., assignors to Cluett, Peabody & Co., Inc., Troy, N. Y., a corporation of New York Original application November 20, 1937, Serial No. 175,690. Divided and this application September 23, 1939, Serial No. 296,238

4 Claims. (Cl. 154—46)

This invention pertains to garments, for example, fused collars or cuffs, in which constituent plies or webs are adhesively united and stiffened by fusion of a normally dry or substantially non-sticky bonding substance present as an adherent part of the article structure prior to the fusing operation, the present application being a division of the application for Letters Patent filed jointly by Swan and Donaldson November 20, 1937, Serial No. 175,690, now issued as Patent No. 2,218,387, dated October 15, 1940. The union of the plies of a collar or the like by fusion is fully disclosed in the patents to Liebowitz Nos. 1,968,-409 and 1,968,410, granted July 31, 1934; and in the co-pending application of Thomas H. Swan for Letters Patent, Serial No. 5,105, filed February 5, 1935.

It is essential to the manufacture of acceptable fused collars, cuffs, shirts, etc. that the material or materials employed in stiffening the article be of such character and so incorporated that the appearance and feel of the exposed surface of the finished article is not appreciably different from that of a similar article stiffened by laundry starching. For this reason the fusing process contemplates the employment of an adhesive supplied in substantially the minimum amount capable of causing the plies to adhere and of imparting the desired stiffness,—since any excess of the adhesive material tends to exude through the interstices of the facing ply and to appear at the outer surface of the latter in the form of spots, unduly high gloss, or other undesirable effects.

As a preliminary to the fusing process, the article to be fused, hereinafter for convenience, but without limiting intent, referred to as a "collar," may be made to include an interliner ply or layer consisting of a textile fabric, usually woven and usually predominantly of cotton or linen yarn, but having interspersed therein, at spaced intervals, synthetic yarns, for example warp yarns made from a bonding medium capable of becoming sticky when subjected to suitable treatment and of thereafter again resuming a dry and stiff phase. After the article has been put through the fusing process, these synthetic yarns remain behind, usually no longer as distinct strands, but rather as a more or less checkered or discontinuous film adhesively binding the facing or outer ply to the cotton or linen yarns of the interliner. Whereas the bonding medium suggested by Liebowitz is cellulose acetate or the like, which must be treated with a solvent as a step in the fusing operation, Swan, in his copending application above referred to, suggests the use of a bonding medium of thermoplastic nature, for example a synthetic resin such as a vinyl polymer, capable of effecting bonding under the action of heat and pressure only.

For the outer or facing ply or web of the collar it has been customary to employ a fine cotton or linen fabric, for example, broadcloth, woven from yarn of small diameter, such as 40's cotton,—hard twisted or spun, and in close, usually one-and-one weave, with, for example, 136 warp ends and 60 filling ends per inch. After finishing, such a material has a hard, smooth and somewhat glossy surface.

Unlike the ordinary starched collar, which at frequent intervals, to wit, at each laundering, receives a fresh supply of stiffening and adhesive material in the form of starch, a collar of the fused and self-stiffened type is expected to preserve, throughout its normal life, the stiffness imparted to it during manufacture. As already noted, the amount of stiffening adhesive material which may permissibly be supplied during manufacture is quite limited, and it has been observed that many collars of the fused type, long before the outer ply fabric has actually begun to show signs of wear, exhibits a marked tendency for the outer ply to separate from the interliner, forming bubbles or blisters, indicative of failure of the adhesive firmly and permanently to consolidate the several plies.

A reasonable explanation of such tendency to separate or blister may be deduced from the results of microscopic examination of a fused collar made from the material heretofore employed. Such examination shows that the adhesive derived from the synthetic yarns of the interliner during the fusing process fails to find a secure anchorage to the inner surface of the facing ply for the reason that such surface, as already noted, is commonly hard, smooth and non-absorbent, and its constituent fine hard yarns form smooth, low undulations at the surface of the fabric where the yarns of one set pass over the yarns of the other set.

A principal object of the present invention is to provide a novel collar structure whose constituent plies or layers remain firmly bound together during use.

As already noted, the fusing process must not result in changing the external appearance of the completed collar, as compared with that of the ordinary laundry starched collar, and likewise it is not permissible, in the making of a fused collar, to employ an outer ply material which itself is substantially different in external appearance from the materials, for example cotton or linen broadcloth, commonly employed for such purpose. Accordingly, a further object of the invention is to provide an improved collar structure and method of making the same wherein and whereby the outer or facing ply may have an external appearance acceptable to the trade but of a structure such as, at its inner surface, to provide firm and adequate anchorage for the adhesive element of the interliner.

Other objects and advantages of the invention will be made manifest in the following more detailed description and by reference to the accompanying drawing, wherein:

Fig. 1 is a rear elevation of a completed collar of the fused type such as that to which the present invention relates, the collar being unfolded and having a portion of its rear ply broken away to show the interior construction;

Fig. 2 is a diagrammatic plan view, to enlarged scale, illustrating fusible interliner material of one of the kinds commonly employed in the manufacture of such collars;

Fig. 3 is a diagrammatic section illustrative of the appearance of a portion of a usual collar fabric structure under the microscope and illustrative of one of the reasons for the failure of the adhesive properly to unite the facing ply to the interliner;

Fig. 4 is a view similar to Fig. 3, but illustrative of a condition which it would be desirable to obtain;

Fig. 5 is a view similar to Fig. 4 illustrative of one practical embodiment of the present invention whereby a firm anchorage is obtained between the interliner and the outer ply;

Fig. 6 is a diagrammatic view illustrating the effect of using a three-strand yarn in the facing ply;

Fig. 7 is a fragmentary diagrammatic section, to much smaller scale than Fig. 5, showing the outer or facing ply and the interliner secured together, the outer ply having filling yarns of the type shown to larger scale in Fig. 5;

Fig. 8 is a view similar to Fig. 7 but showing the outer ply as having three-strand warp yarns and single-strand filling yarns;

Fig. 9 is a similar view but showing both warp and filling of three-strand yarn; and Fig. 10 is a view similar to Fig. 9 but showing the use of two-strand yarn.

Referring to the drawing, Fig. 1 illustrates the invention by way of example as embodied in a self-stiffened shirt collar, although it is to be understood that the invention is not necessarily limited in its applicability to shirt collars. In Fig. 1 the collar is shown as permanently attached to the upper part of a shirt 1, the collar comprising the band portion 2 and the top 3. The top, as here illustrated, comprises the improved outer or facing ply or layer 4 of the present invention, the back or rear ply or layer 5, and the lining ply or interliner 6. This interliner 6 is of a type having inclusions of normally dry or substantially non-sticky cementitious material which may be caused to become adhesive at the proper stage in the manufacture of the collar, thereby to unite the several plies and to impart the desired degree of stiffness, it being noted, however, that this cementitious material is of a waterproof or water-resistant type and designed to form a permanent part of the collar as distinguished from such a stiffening material as starch, which must be renewed at every laundering. As a suitable interliner material, a fabric generally similar to that disclosed in the Liebowitz patents above referred to has been selected by way of example. This fabric, as diagrammatically shown in Fig. 2, comprises the normal weft threads 7 of natural textile fiber, for example cotton, silk or the like, and the normal warp threads 8 also usually of some natural textile fiber such as cotton, but having interspersed between these normal warp threads special warp threads $8^a$ of a substance such, for example, as a cellulose derivative, synthetic resin or the like, which is normally dry and non-adhesive but which may be made adhesive after assembly of the interlining with the other plies of the garment by treatment with a solvent, heat, or other suitable means, whereupon such special warp threads $8^a$ partially or wholly dissolve or soften, forming an adhesive film or layer which in setting is designed to unite the several plies of the collar in a permanent manner and impart the desired stiffness.

In accordance with the usual prior practice, the material which is to be used for the facing ply is woven from hard spun single-strand yarns closely woven so as to give the desired smoothly finished surface. It has been found, however, that when the facing ply is made of this smoothly finished material, of which cotton broadcloth may be cited as a good example, the finished collar shows a marked tendency, after a short period of use and after a few launderings, to blister due to the separation of the facing ply from the interliner. It may here be repeated that it is essential to the commercial acceptability of collars made by the fusing process that the outer surface of the facing ply of the completed collar have substantially the same appearance, feel and finish as the surface of an ordinary starch-laundered collar, and for this reason it is necessary to limit the amount of adhesive employed so that, during the fusing operation, it cannot exude through the interstices of the facing ply and thus appear in the form of shiny spots at the outer surface. However, when the maximum permissible amount of adhesive is used in an interliner such as that of Fig. 2, it is found that blisters quite frequently appear in the collar after use, and that the life of the collar is thus very seriously shortened.

One of the reasons for this effect is indicated diagrammatically in Fig. 3, which is a more or less diagrammatic cross-sectional view illustrative of usual prior practice and showing a single ordinary filling yarn of the facing ply and a portion of the adhesive film resulting from the treatment of the special warp threads of the interliner, and wherein the parts are shown to greatly enlarged scale, the adhesive film being indicated at $6^a$ and the single-strand filling yarn at $4^a$, such yarn consisting of a bundle of individual fibers 9 suitably associated, as by spinning, to form a continuous strand. As illustrated, the constituent fibers 9 of the single-strand yarn $4^a$ are closely crowded together at the periphery of the yarn, so that those fibers $9^a$, for example, which are exposed to the adhesive forming the layer $6^a$, mutually exclude the adhesive from entrance into the substance of the yarn. The adhesive thus only touches the substantially smooth and hard peripheral surface of the yarn and obtains little real anchorage. When the collar undergoes flexing during laundering, there is a tendency for the adhesive layer to break away from the hard smooth surfaces of the yarns, thus releasing the facing ply so that blisters form.

An ideal condition is that represented in Fig. 4, wherein the yarn 4ª is shown as comprising a large number of constituent fibers 10 which in this instance are separated so that substantial interstices are left between them, as shown at 10ª, into which the plastic adhesive may readily enter and penetrate into the substance of the yarn and more or less completely surround the individual fibers. However, this ideal condition cannot well be realized in the manufacture of such fabrics as are acceptable for use in the finer grades at least of collars, cuffs, or the like,—the use of loose and open yarns in the facing ply being precluded as a practical matter, except possibly for some special and relatively less important types of garment.

In accordance with the present invention, results substantially equivalent to that indicated in Fig. 4, that is to say, the firm and permanent anchorage of the facing ply to the interliner, may be secured by practical and commercial methods and without sacrificing the desired fine appearance of the outer surface of the facing ply. In accordance with the present invention, certain of the yarns used in the facing ply, for example, each filling and/or weft yarn, as illustrated in Figs. 5, 6 and 7, consists of a plurality of independent spun strands twisted together in accordance with well known methods to form the yarns which are used in weaving the facing ply or web. While it is contemplated that these multi-strand yarns may consist of two or any greater number of individually spun strands twisted together, the arrangement illustrated in Figs. 5, 6 and 7 contemplates the employment of filling yarns 4ᵇ, each consisting of three strands $a$, $b$ and $c$, each spun from a plurality of individual fibers 12 (Fig. 5). These filling yarns, as shown in Fig. 7, are interwoven with single-strand warp yarns 13.

In Figs. 8, 9 and 10, modifications are illustrated, the first showing three-strand warp yarns 13ˣ and single-strand filling yarns 4ˣ; the second showing three-strand warp yarns 13ʸ and three-strand filling yarns 4ʸ; and the last showing two-strand warp yarns 13ᶻ and two-strand filling yarns 4ᶻ. Whatever arrangement be employed, it may be noted, for example by reference to Figs. 5 and 6, that at the inner face of this ply or web (which is exposed to the layer 6ª of cementitious material) certain of the successive helical bights of each of the strands $a$, $b$ and $c$ stand out from the surface of the fabric so that the adhesive material is able substantially to surround such projecting helical bights. Thus as shown in Fig. 5, a portion of the strand $c$ is nearly surrounded by the adhesive material, a large part of its periphery being free to contact with the adhesive. As shown in Fig. 6, at successive transverse sections of the yarn 4ᵇ, bights of the strands $c$, $b$ and $a$, respectively, will thus be exposed at the inner side of the ply so as to be firmly embedded and anchored in the adhesive substance. Such an arrangement affords a very permanent union between the interliner ply and the facing ply and it is found in practice that such an arrangement very markedly reduces the tendency to blister and imparts a much longer useful life to the collar than when outer ply fabric of usual type is employed.

It is to be understood that the embodiments illustrated are to be regarded as representative and emblematical of any appropriate arrangement of twisted multiple strand yarns of such character that the rear or inner surface of the facing ply fabric is distinctly rough, comprising helical bights of a size such that the adhesive material of the interliner may flow about and embrace, partially embrace or embed such bights, thereby to obtain a firm and positive and permanent grip such as securely to unite the facing ply to the interliner.

The term "bight" as here used may be defined as one of the more or less U-shaped or horseshoe-shaped bends or elbows, whether plain or helical, made by a yarn of one set or by a strand of a multi-strand yarn where said yarn or strand curves about and partially embraces a yarn of the other set or another constituent strand of the multi-strand yarn, respectively, such bend closely and firmly engaging the yarn or strand which it partially embraces, and is to be distinguished from such loose projecting elements as long loops, floats, or nap fibers not constituting portions of the yarn essential to the integrity of the fabric structure.

While it is obvious that it is more important that the facing ply be thus permanently and securely united to the interliner than that the rear ply should be so united, it is to be understood that in place of the usual relatively cheap and thin rear ply there may be substituted, if desired, a fabric similar to the above-described front ply and provided with an inner rough anchorage surface to ensure perfect union with the interliner ply.

It is also to be recognized that while, as above described, the use of a relatively thin interliner ply such as that disclosed in the Liebowitz patent is contemplated, and wherein such interliner ply comprises elements of natural textile material which maintain their integrity after the completion of the fusing operation, the invention is broadly inclusive of such other procedures and the use of such other interliners as may be useful in the manufacture of fused collars and including those modifications in which the entire interliner may be of fusible material; or wherein the opposed faces of the outer and inner plies and/or the interliner may be coated with a continuous film or layer of thermoplastic bonding medium, as more specifically described in the Swan application above referred to; or wherein the bonding medium may be disposed to form mere scattered dots or flattened globules carried by a foundation fabric of non-adhesive type; or in which the interliner, during the fusing operation, loses its structural characteristics, constituting in effect merely a convenient supply of adhesive and leaving the finished collar or other article to consist, so far as actual fabric is concerned, merely of the facing and rear plies directly united by the interposed adhesive film; or wherein the only "interliner" is a normally non-adhesive coating, layer, or deposit of the selected bonding medium applied directly to the inner surface of either or both facing or rear ply before assembly (said ply or plies having the characteristics above more fully described), in which event the completed collar would be a "two-ply" fused collar. All such possible modifications and adaptations of the invention are to be regarded as within the purview of the invention, as defined in the appended claims.

We claim:

1. A moisture-pervious fused collar of the kind which has facing and rear webs of textile fabric, and a lining fabric including textile strands and a cementitious material, said cementitious material being initially non-adhesive but inherently capable of being made adhesive and of uniting and stiffening the facing and rear webs to form a composite collar structure, the facing web being of a substantially uniform surface texture and appearance and comprising a set of warp yarns interwoven with a set of weft yarns and having an outer surface which is commercially acceptable for use in collars and which is substantially free from cementitious material, the facing web being substantially thicker than the lining fabric, characterized in that the yarns of both of said sets are twisted three-strand yarns, said three-strand yarns being exposed at the inner face of said facing web and having helical bights of their constituent strands held in an encircling grip by the cementitious material.

2. A moisture-pervious fused collar of the kind which has facing and rear plies stiffened and united by an intermediate layer of textile lining material having incorporated therein spaced elements of a cementitious substance which is initially non-adhesive but which is inherently capable of being made adhesive, the facing ply being of a substantially uniform surface texture and appearance and comprising interwoven warp and weft yarns, characterized in that the warp yarns are single-strand yarns and the weft yarns are twisted multi-strand yarns having helical bights of their constituent strands exposed at the inner face of said ply and constituting key elements which are held with an encircling grip by the cementitious material.

3. A moisture-pervious fused collar of the kind which has facing and rear webs stiffened and united by an intermediate textile lining layer comprising a cementitious substance that is initially non-adhesive but which is inherently capable of being made adhesive, the facing web being of substantially uniform surface texture and appearance and comprising a set of warp yarns interwoven with a set of weft yarns, characterized in that the yarns of both sets are twisted multi-strand yarns, said twisted yarns being exposed at the inner face of said facing web and having helical bights of their constituent strands embedded in and substantially embraced by the cementitious substance.

4. A fused shirt collar including a woven textile facing web comprising a set of warp yarns interwoven with a set of weft yarns, a rear woven textile web and a lining fabric relatively less dense than the facing web and carrying a cementitious binding material uniting the aforementioned facing and rear webs to form a composite collar structure, the exposed surface of said facing web being of a substantially uniform texture and appearance and acceptable for its intended use, characterized in that the yarns of at least one of said sets are twisted multi-strand yarns, said multi-strand yarns being exposed at the inner face of said facing web and having helical bights of their constituent strands embedded in the cementitious material and held with an encircling grip by the latter, thereby to afford a firm anchorage between said outer woven web and the intermediate web.

THOMAS H. SWAN.
HARRY C. DONALDSON, Jr.